United States Patent [19]

Spanski

[11] Patent Number: 5,102,377
[45] Date of Patent: Apr. 7, 1992

[54] ROTARY ACTUATOR WITH EPICYCLIC TRANSMISSION

[75] Inventor: Harold Spanski, Lynden, Wash.

[73] Assignee: Stanley Spanski, Kent, Wash.

[21] Appl. No.: 682,619

[22] Filed: Apr. 8, 1991

[51] Int. Cl.⁵ ............................................. F16H 1/28
[52] U.S. Cl. .................................. 475/162; 475/176; 901/25
[58] Field of Search ............... 475/150, 162, 168, 176, 475/177, 178, 181; 74/640; 901/25, 28

[56] References Cited

U.S. PATENT DOCUMENTS

| | | | |
|---|---|---|---|
| 3,052,138 | 9/1962 | Louton, Jr. et al. | 475/176 |
| 3,987,498 | 10/1976 | Mason | 901/28 |
| 4,096,766 | 6/1978 | Pardo et al. | 901/28 |
| 4,117,746 | 10/1978 | Pierrat | 475/181 X |
| 4,282,777 | 8/1981 | Ryffel et al. | 475/177 X |
| 4,424,473 | 1/1984 | Gorman et al. | 901/25 |
| 4,589,816 | 5/1986 | Eberle et al. | 901/28 |
| 4,690,010 | 9/1987 | Matsumoto et al. | 901/28 |
| 4,738,576 | 4/1988 | Eberle et al. | 901/28 |
| 4,784,015 | 11/1988 | Schumacher | 74/640 |
| 4,807,494 | 2/1989 | Lew | 475/176 X |
| 4,840,090 | 6/1989 | Iwata | 901/25 |
| 4,951,517 | 8/1990 | Azuma et al. | 901/25 |

FOREIGN PATENT DOCUMENTS

| | | | |
|---|---|---|---|
| 0211687 | 2/1987 | European Pat. Off. | 475/162 |
| 2424042 | 1/1975 | Fed. Rep. of Germany | 475/162 |
| 0569556 | 11/1957 | Italy | 475/176 |

Primary Examiner—Leslie A. Braun
Assistant Examiner—Khoi Q. Ta

[57] ABSTRACT

A rotary actuator suitable for a robotic arm or servo drive, which is capable of large loads and large speed reductions is disclosed. The device includes an input shaft that drives an epicyclic transmission integral with the articulation. The transmission is contained in a fixed arm housing and an end housing. An input shaft has eccentrics that rotate two primary external spur gears which are engaged with two primary internal gears. The two primary external gears are fastened on both faces of the external secondary gear. The external primary gears and external secondary gear rotate about the axis of an eccentric, and orbit the input shaft axis. A secondary external gear transmits its rotary motion to an internal secondary gear affixed to an output arm. Large speed reductions are possible due to the differential action of the primary and secondary gears.

9 Claims, 2 Drawing Sheets

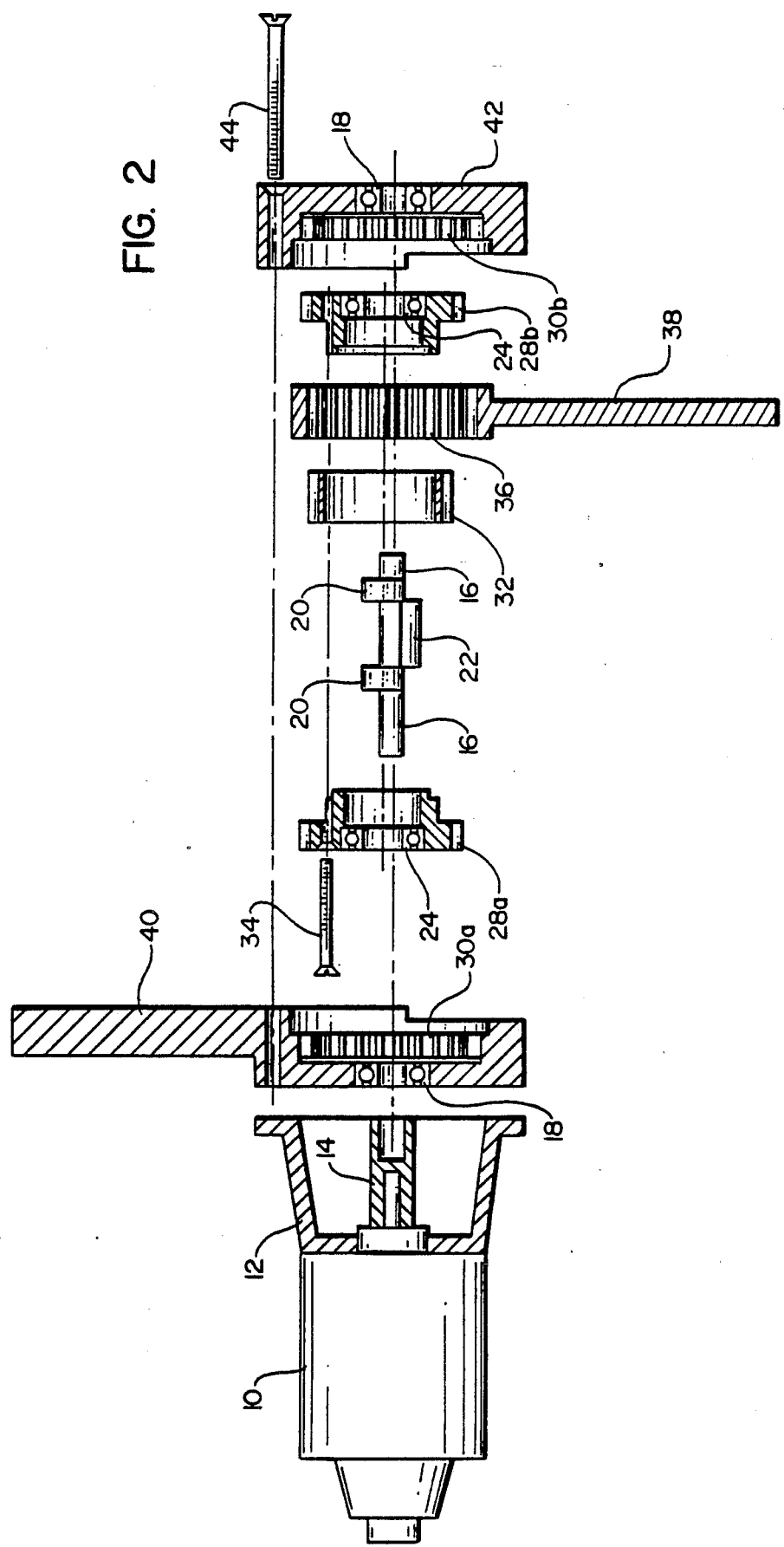

ROTARY ACTUATOR WITH EPICYCLIC TRANSMISSION

BACKGROUND-FIELD OF INVENTION

This invention relates to rotary actuators, and particularly to robot joints having an electric drive and an epicyclic transmission.

BACKGROUND-DESCRIPTION OF PRIOR ART

Many rotary actuators are known in the prior art. Their function is to comprise a joint or articulation capable of permitting a relative angular movement between two elements However, these known arrangements are attended by various inconveniences:

The joint is excessively complicated because: it contains large numbers of component parts since a large speed reduction of the drive motor is desirable; articulation cannot be as precise in angular location as desired due to accumulated component tolerance and wear; is physically large in relation to the power transmitted.

A variety of means to transmit power to the articulation have been described. Conventional external spur or planetary gear trains have been utilized. However, to provide the ratios that are necessary, many stages of gears are required. This is a serious disadvantage. Accuracy and repeatability are difficult to achieve since any backlash in a particular stage of gearing will be multiplied by each successive stage.

In addition to low power efficiency, conventional spur gear trains and planetary gear trains suffer from additional disadvantages. Consequently, gears in these arrangements must be made physically larger to accommodate these factors. This makes a compact articulation or joint more difficult to construct. These gear trains are characterized by excessive noise and vibration in operation. Robotic arms when used with this type of articulation multiply unwanted motion enormously because of the articulated arm length and accumulated tooth mesh tolerances.

The prior art includes an adaptation of a harmonic drive as a means of speed reduction for an articulation. U.S. Pat. No. 2906143 to Musser (9/1959) describes this type of transmission. It is comprised of a rigid elliptical wave generator which is forced into contact with the internal teeth of a flexible cylindrical flexspline. The external teeth of the flexspline engage teeth of the internal cylindrical surface of an annulus.

Adaptations of this transmission are described by the following. U.S. Pat. No. 4,096,766 Pardo et.al. (6/1978), U.S. Pat. No. 4,784,015 Schumacher (6/1989), U.S. Pat. No. 4,840,090 Iwata (6/1989).

This transmission and articulation allows somewhat larger ratios in one stage but suffer from disadvantages inherent in a flexible member. Fatigue and relatively low power transmission capabilities relative to size are common.

OBJECTS AND ADVANTAGES

By the present invention there is provided an articulation and speed reducing device which has been found to overcome the disadvantages associated with the prior art.

One object of this invention is to provide a robust articulation and transmission capable of handling large loads in a compact assembly with less weight.

Another object of this invention is to provide an articulation capable of very high speed reduction ratios allowing coupling to higher speed motors with less inertia, yielding faster positioning.

Another object of this invention is to provide a speed reduction device having a higher tooth contact ratio in the gearing resulting in less wear, lower levels of noise and vibration with higher power transmission capabilities. Lower wear will result in less backlash, better accuracy and repeatability in a robot arm or other embodiment.

Another object of this invention is to provide greater efficiency, reliability, and a larger safety factor.

Another object is to allow simplified manufacturing, assembly, and overall costs because of fewer parts Another object is to provide a speed changer whose ratios can be easily altered.

Other objects of the invention will be apparent hereinafter from the specification and from the recital of the appended claims, particularly when read in conjunction with the accompanying drawings.

BRIEF DESCRIPTION OF THE DRAWINGS

The rotary actuator system of the present invention will be more clearly understood from the following description of the present embodiment, taken in conjunction with the accompanying drawings, wherein

FIG. 2 is an exploded section view of an embodiment.

Figure 1:
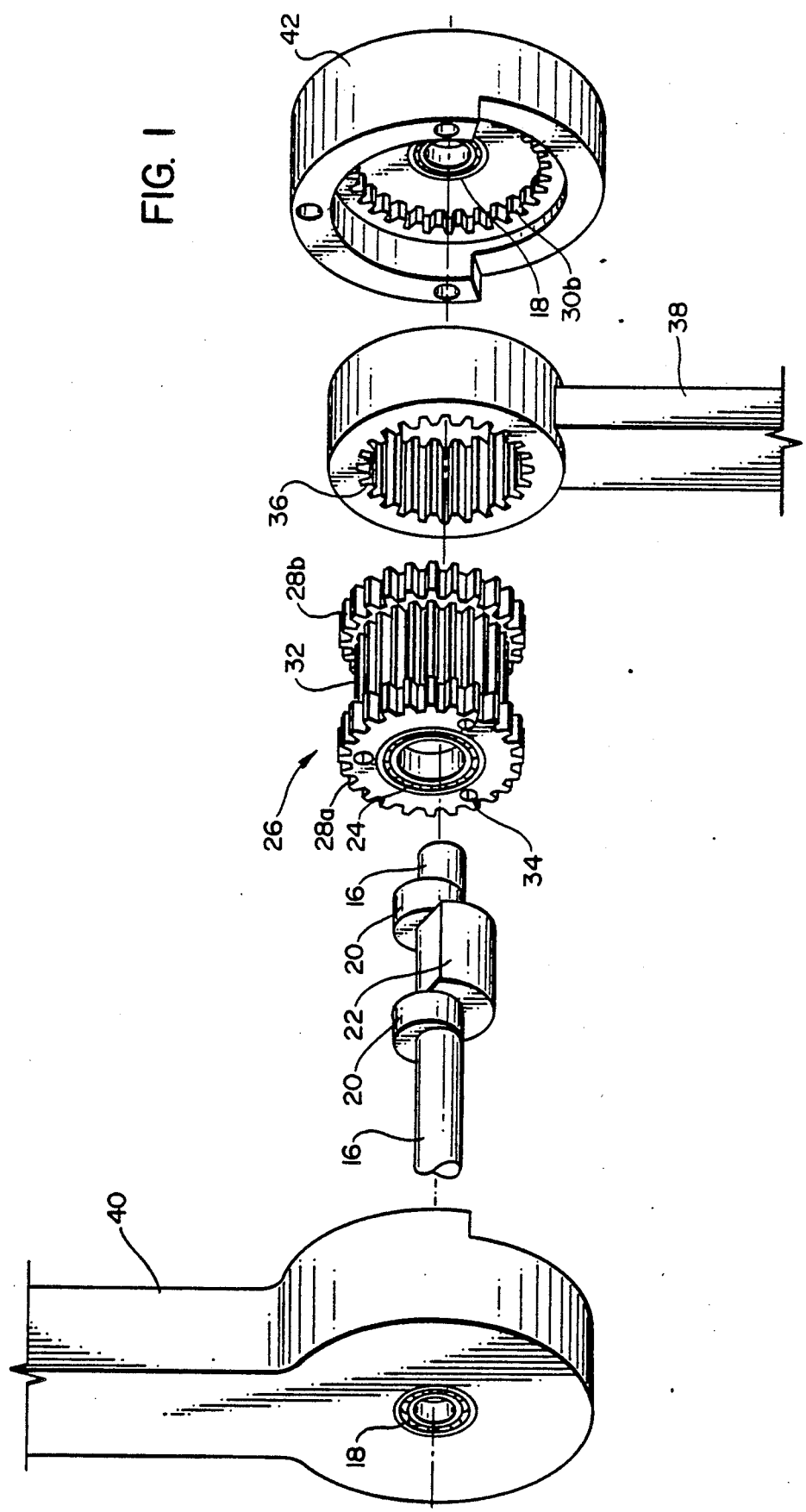
FIG. 1 is an exploded isometric view of an embodiment.

Reference Numerals in Drawings 10 electric motor
12 motor flange
14 drive coupler
16 input shaft
18 input shaft bearing
20 eccentric
22 counterweight
24 eccentric bearing
26 gear cluster
28a external primary gear
28b external primary gear
30a internal primary gear
30b internal primary gear
32 external secondary gear
34 external gear fastener
36 internal secondary gear
38 output arm
40 fixed arm housing
42 end housing
44 housing fastener

DESCRIPTION OF AN EMBODIMENT - FIG. 1 and FIG. 2

The embodiment of the present invention is shown in FIG. 1 and FIG. 2. An electric motor 10 is securely mounted to a motor flange 12. Motor flange 12 is securely mounted to a fixed arm housing 40. The output of electric motor 10 is coupled to an input shaft 16 with drive coupler 14. Two eccentrics 20 ar integral to input shaft 16. A counterweight 22 is integral to input shaft 16 and positioned between eccentrics 20 and is located in a cavity in gear cluster 26. The moment of counterweight 22 and moment of the eccentrics 20, are 180 degrees out of phase during rotation of input shaft 16. Dynamic balance is achieved by counterweight 22.

A pair of input shaft bearings 18 journal the input shaft 16 and are mounted in fixed arm housing 40 and end housing 42. External primary gears 28a and 28b are mounted on eccentric bearings 24, which journal eccentrics 20. External primary gears 28a and 28b mesh with internal primary gears 30a and 30b. Internal primary gears 30a and 30b are integral to fixed arm housing 40 and end housing 42. The toothed surfaces of external primary gears 28a and 28b should be identical and have the same number of teeth and physical characteristics. The toothed surfaces of internal primary gears 30a and 30b should be identical and have the same number of teeth, and physical characteristics. The ratios of both external primary gears 28a and 28b and their meshing internal primary gears 30a and 30b must be the same.

External primary gears 28a and 28b, and external secondary gear 32 rotate about the common axis of the eccentrics 20, and are coupled and fastened to each other using external gear fasteners 34. External primary gears 28a and 28b and external secondary gear 32 comprise gear cluster 26. The teeth of external primary gears 28a and 28b must be in alignment in regard to rotation about the axis of eccentrics 20 (i.e. in phase) to allow the proper meshing with internal primary gears 30a and 30b. Likewise, the teeth of internal primary gears 30a and 30b must be in alignment in regard to rotation about the axis of input shaft 16 (i.e. in phase), to allow the proper meshing with external primary gears 28a and 28b.

The teeth of external secondary gear 32 mesh with the teeth of internal secondary gear 36. Internal secondary gear 36 is attached to output arm 38. Fixed arm housing 40 and end housing 42 are attached to each other by housing fasteners 44.

OPERATION OF AN EMBODIMENT - FIG. 1 and FIG. 2

The operation of the articulation in FIG. 1 and FIG. 2 is as follows. An electric motor 10 rotates input shaft 16 and its eccentrics 20. Counterweight 22 rotates with input shaft 16 since it is formed integrally. Eccentrics 20 orbit the axis of input shaft 16. Eccentric bearings 24 allow rotation of attached external primary gears 28a and 28b about eccentrics 20. External primary gears 28a and 28b are engaged with internal primary gears 30a and 30b causing the meshed gear cluster 26 to orbit within internal primary gears 30a and 30b and to rotate in an opposite direction of rotation to the rotation of input shaft 16. Since external primary gears 28a and 28b and external secondary gear 32 are coupled and fastened by external gear fasteners 34, power is transmitted to external secondary gear 36. External secondary gear 32 drives internal secondary gear 36 which is affixed to output arm 38. The angular rotation of output arm 38 is small in relation to the rotation of input shaft 16 due to the differential action of primary gears 28a, 28b, 30a, 30b and secondary gears 32 and 36. A reduction of angular rotation can be up to several thousand to one or larger, depending on the gear combinations chosen.

CONCLUSIONS, RAMIFICATIONS AND SCOPE OF THE INVENTION

Accordingly, the reader will see that the articulation and speed reducing mechanism will result in many advantages for use as a robot arm joint and other rotary actuator embodiments.

Capable of handling heavy loads because of rugged design.

Capable of high reduction ratios allowing use of high speed motors with low inertia yielding faster positioning.

Capable of more accurate positioning, longer life, lower noise, and vibration because of the higher contact ratios of the gears.

Capable of greater mechanical efficiencies and larger safety factors.

Although the description above contains many specificities, these should not be construed as limiting the scope of the invention, but as merely providing an illustration of an embodiment of this invention.

Accordingly, the scope of the invention should be determined not by the embodiment illustrated, but by the appended claims and their legal equivalents.

I claim:

1. A rotary actuator, comprising: an input shaft; a fixed arm housing journaled for said input shaft; an end housing journaled for said input shaft; a counterweight formed integrally with said input shaft; two eccentrics formed integrally with said input shaft and located on either face of said counterweight and 180 degrees out of phase with said counterweight; two external primary gears journaled for rotation about said eccentrics; an external secondary gear formed integrally with said external primary gears sandwiched between said two external primary gears for rotation about said eccentric; two internal primary gears are meshed with two said external primary gears; said two internal primary gears are integral to said fixed arm housing and said end housing; an internal secondary gear is meshed with said external secondary gear; said internal secondary gears whose teeth are integral to an output arm.

2. The device of claim 1, wherein input shaft bearings journal said input shaft.

3. The device of claim 1, wherein eccentric bearings journal said eccentrics.

4. The device of claim 1, wherein said external primary gears and said external secondary gear are separate elements and are fastened by external gear fasteners.

5. The device of claim 1, wherein said internal secondary gear is a separate element and is fastened to said output arm.

6. The device of claim 1, wherein said internal primary gears are separate elements and are mounted in said fixed arm housing and said end housing.

7. The device of claim 1, wherein an electric motor drives said input shaft.

8. The device of claim 1, wherein said primary external gears have a smaller pitch diameter than said secondary external gear pitch diameter.

9. The device of claim 1, wherein said primary external gears have a larger pitch diameter than said secondary external gear pitch diameter.

* * * * *